(12) United States Patent
Chen

(10) Patent No.: US 9,601,991 B2
(45) Date of Patent: Mar. 21, 2017

(54) SWITCHING REGULATOR CONTROL CIRCUIT

(75) Inventor: Jian Chen, Matsumoto (JP)

(73) Assignee: FUJI ELECTRIC CO., LTD., Kawasaki-shi (JP)

(*) Notice: Subject to any disclaimer, the term of this patent is extended or adjusted under 35 U.S.C. 154(b) by 644 days.

(21) Appl. No.: 13/438,398

(22) Filed: Apr. 3, 2012

(65) Prior Publication Data

US 2012/0250362 A1 Oct. 4, 2012

(30) Foreign Application Priority Data

Apr. 4, 2011 (JP) ................................. 2011-083093

(51) Int. Cl.
*H02M 3/335* (2006.01)
*H02M 1/42* (2007.01)

(52) U.S. Cl.
CPC ......... *H02M 1/4258* (2013.01); *Y02B 70/126* (2013.01)

(58) Field of Classification Search
CPC ......... H02M 3/33569; H02M 3/33507; H02M 3/335
USPC .................... 363/20, 21.01, 95, 97
See application file for complete search history.

(56) References Cited

U.S. PATENT DOCUMENTS

| | | | | |
|---|---|---|---|---|
| 5,115,185 A * | 5/1992 | Fraidlin et al. | | 323/207 |
| 5,642,267 A * | 6/1997 | Brkovic | | G05F 1/613 323/224 |
| 6,178,104 B1 * | 1/2001 | Choi | | 363/89 |
| 7,538,525 B2 * | 5/2009 | Kim | | G05F 1/70 323/205 |
| 7,656,686 B2 * | 2/2010 | Yasumura | | 363/21.02 |
| 7,723,964 B2 * | 5/2010 | Taguchi | | H02M 1/4225 323/222 |
| 8,213,194 B2 * | 7/2012 | Koutensky | | H02M 3/33523 315/209 R |
| 8,339,112 B2 * | 12/2012 | Rua et al. | | 323/222 |
| 8,427,853 B2 * | 4/2013 | Uno | | H02M 1/4225 363/125 |
| 9,131,581 B1 * | 9/2015 | Hsia | | H05B 33/0815 |
| 2001/0038545 A1 * | 11/2001 | Hooijer | | H02M 1/4225 363/97 |
| 2004/0164676 A1 | 8/2004 | Omura | | |
| 2004/0252528 A1 * | 12/2004 | Kuwabara | | H02M 1/4258 363/21.07 |

(Continued)

FOREIGN PATENT DOCUMENTS

| | | | |
|---|---|---|---|
| JP | 2000165210 | * | 6/2000 |
| JP | 2002-352980 A | | 12/2002 |
| JP | 2007-080771 A | | 3/2007 |

*Primary Examiner* — Timothy J Dole
*Assistant Examiner* — Sisay G Tiku
(74) *Attorney, Agent, or Firm* — Rossi, Kimms & McDowell LLP

(57) ABSTRACT

In a switching regulator control circuit according to aspects of the invention, a drain current is converted to a voltage Vis with a resistance. The voltage is delivered to a multiplication circuit. The multiplication circuit generates and outputs a voltage that is a product signal of the voltage and a voltage that is proportional to a duty factor. A comparator circuit compares the voltage with an error signal delivered to the other comparison input terminal of the comparator. When the voltage has reached the error voltage, the comparator delivers a turn-off instruction through an OR circuit to a terminal of a flip-flop.

13 Claims, 12 Drawing Sheets

(56) References Cited

U.S. PATENT DOCUMENTS

| | | | | |
|---|---|---|---|---|
| 2005/0162143 A1* | 7/2005 | Fukumoto | ........... | H02M 1/4225 323/284 |
| 2006/0192774 A1* | 8/2006 | Yasumura | ............... | H02M 1/10 345/211 |
| 2009/0195230 A1* | 8/2009 | Adkins | ................. | H02M 3/156 323/282 |
| 2010/0141177 A1* | 6/2010 | Negrete | ............. | H05B 33/0845 315/297 |
| 2011/0075463 A1* | 3/2011 | Osaka | ................... | H02M 3/156 363/127 |
| 2013/0215649 A1* | 8/2013 | Huang | ............. | H02M 3/33523 363/21.17 |
| 2015/0048755 A1* | 2/2015 | Imanaka | ........... | H02M 3/33507 315/291 |
| 2016/0262227 A1* | 9/2016 | Mednik | ............. | H05B 33/0815 |

* cited by examiner

FIG.1 A CONSTRUCTION OF A SINGLE STAGE SWITCHING REGULATOR (THAT IS A CONVERTER) OF A POWER FACTOR CORRECTION TYPE WITH QUASI-RESONANT SWITCHING CONTROL HAVING A FIXED LINE CURRENT CONTROL FUNCTION OF A FIRST EMBODIMENT ACCORDING TO THE PRESENT INVENTION

THE WAVEFORMS OF THE LINE VOLTAGE VAC AND THE LINE CURRENT IAC INDICATED IN FIG. 1, THE SYMBOLS A, B, AND C INDICATING THE VOLTAGES VAC AT THESE DIFFERENT PHASE ANGLES

FIG.3 AN EXAMPLE OF A DUTY FACTOR DETECTION CIRCUIT USED IN THE FIRST EMBODIMENT ACCORDING TO THE PRESENT INVENTION

A TIMING CHART SHOWING WAVEFORMS, IN THE PHASE REGIONS A, B, AND C INDICATED IN FIG. 2, OF VAC, MAX TON, DRV AT THE TERMINAL OUT, VD, IDR, VDR, AND IAC IN THE FIRST EMBODIMENT ACCORDING TO THE PRESENT INVENTION

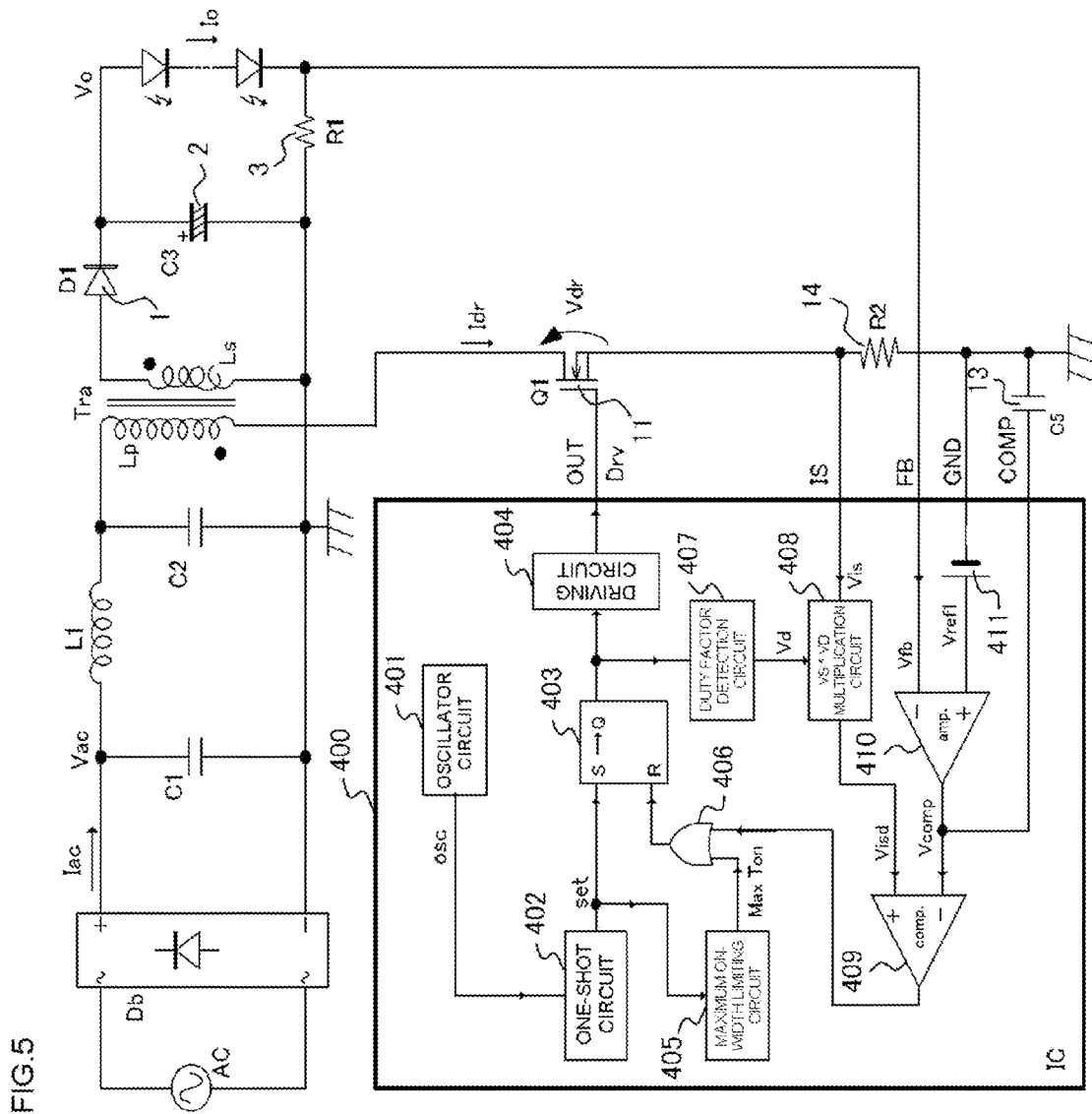
FIG.5 A CONSTRUCTION OF A SINGLE STAGE SWITCHING REGULATOR (THAT IS A CONVERTER) OF A POWER FACTOR CORRECTION TYPE WITH FIXED SWITCHING FREQUENCY CONTROL HAVING A FIXED LINE CURRENT CONTROL FUNCTION OF A SECOND EMBODIMENT ACCORDING TO THE PRESENT INVENTION FIG.6 A TIMING CHART SHOWING WAVEFORMS, IN THE PHASE REGIONS A, B, AND C INDICATED IN FIG. 2, OF VAC, MAX TON, DRV AT THE TERMINAL OUT, VD, IDR, VDR, AND IAC IN THE SECOND EMBODIMENT ACCORDING TO THE PRESENT INVENTION
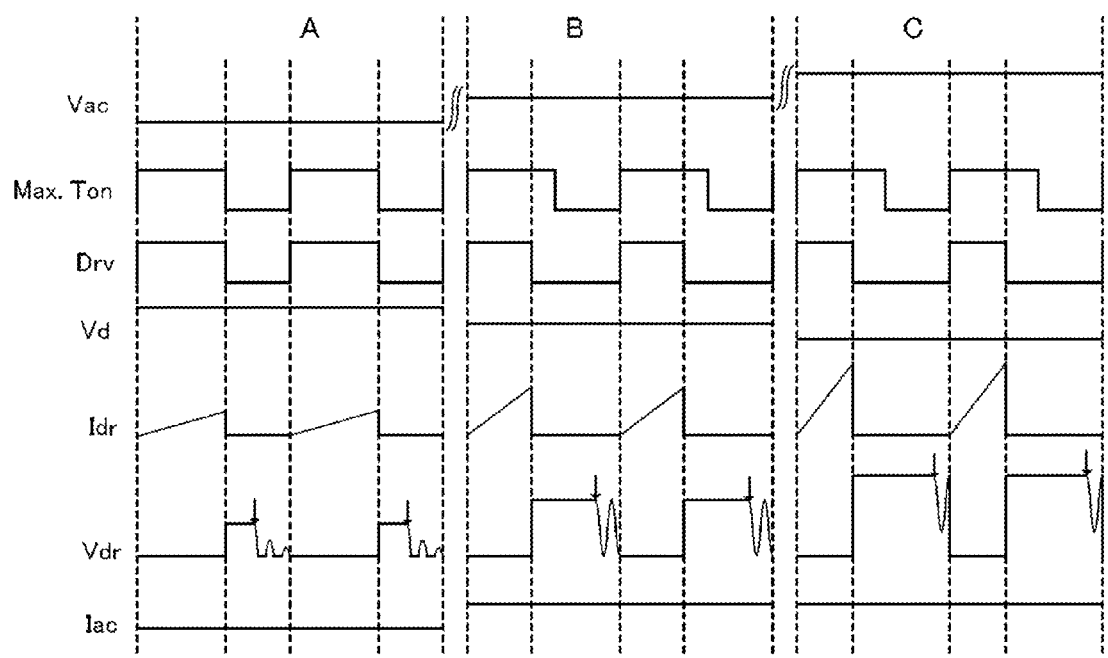

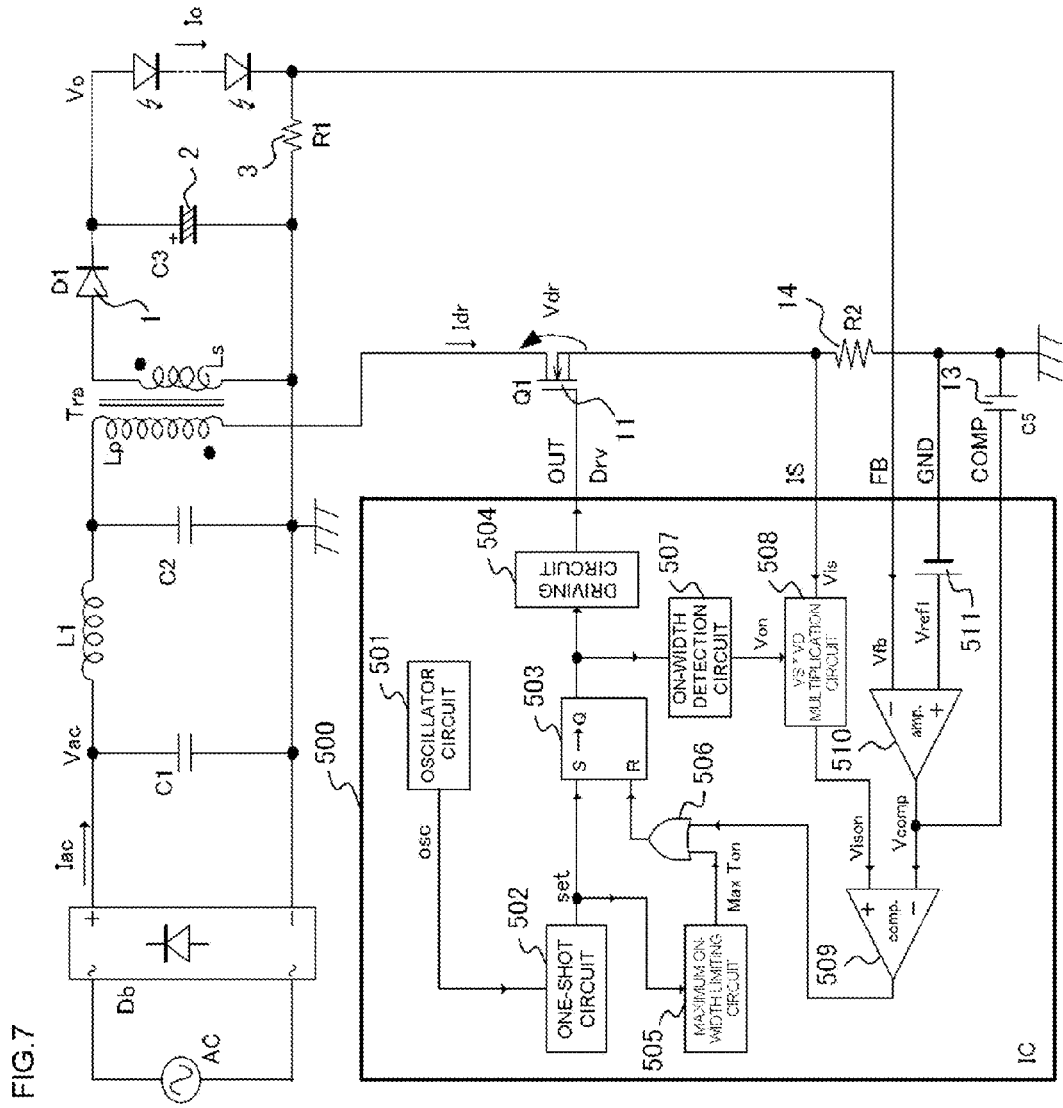
FIG.7 A CONSTRUCTION OF A SINGLE STAGE SWITCHING REGULATOR (THAT IS A CONVERTER) OF A POWER FACTOR CORRECTION TYPE WITH FIXED SWITCHING FREQUENCY CONTROL HAVING A FIXED LINE CURRENT CONTROL FUNCTION OF A THIRD EMBODIMENT ACCORDING TO THE PRESENT INVENTION FIG.8 A TIMING CHART SHOWING WAVEFORMS, IN THE PHASE REGIONS A, B, AND C INDICATED IN FIG. 2, OF VAC, MAX TON, DRV AT THE TERMINAL OUT, VD, IDR, VDR, AND IAC IN THE THIRD EMBODIMENT ACCORDING TO THE PRESENT INVENTION
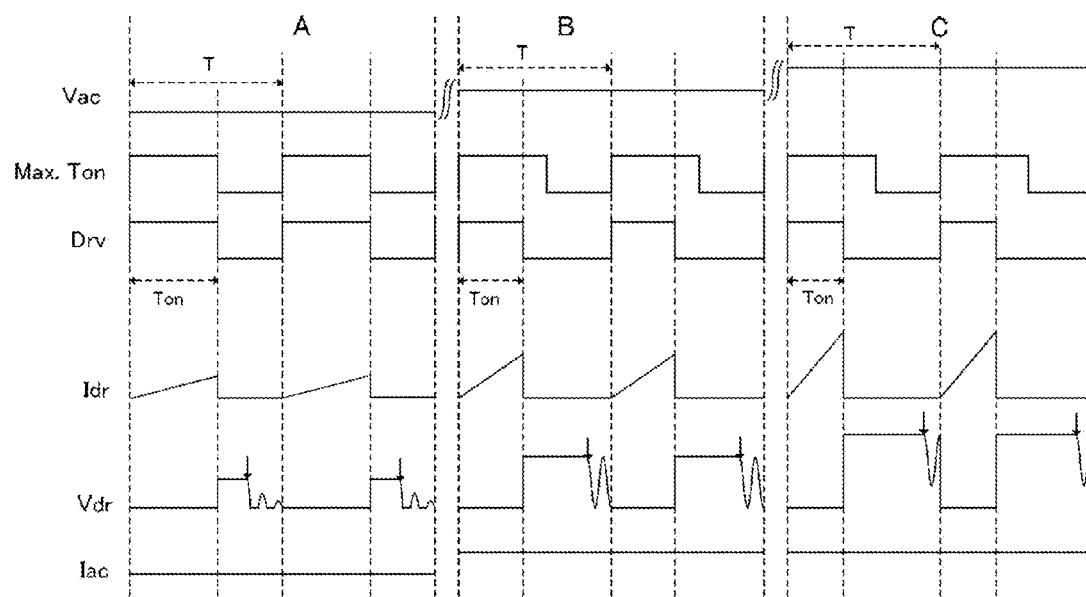

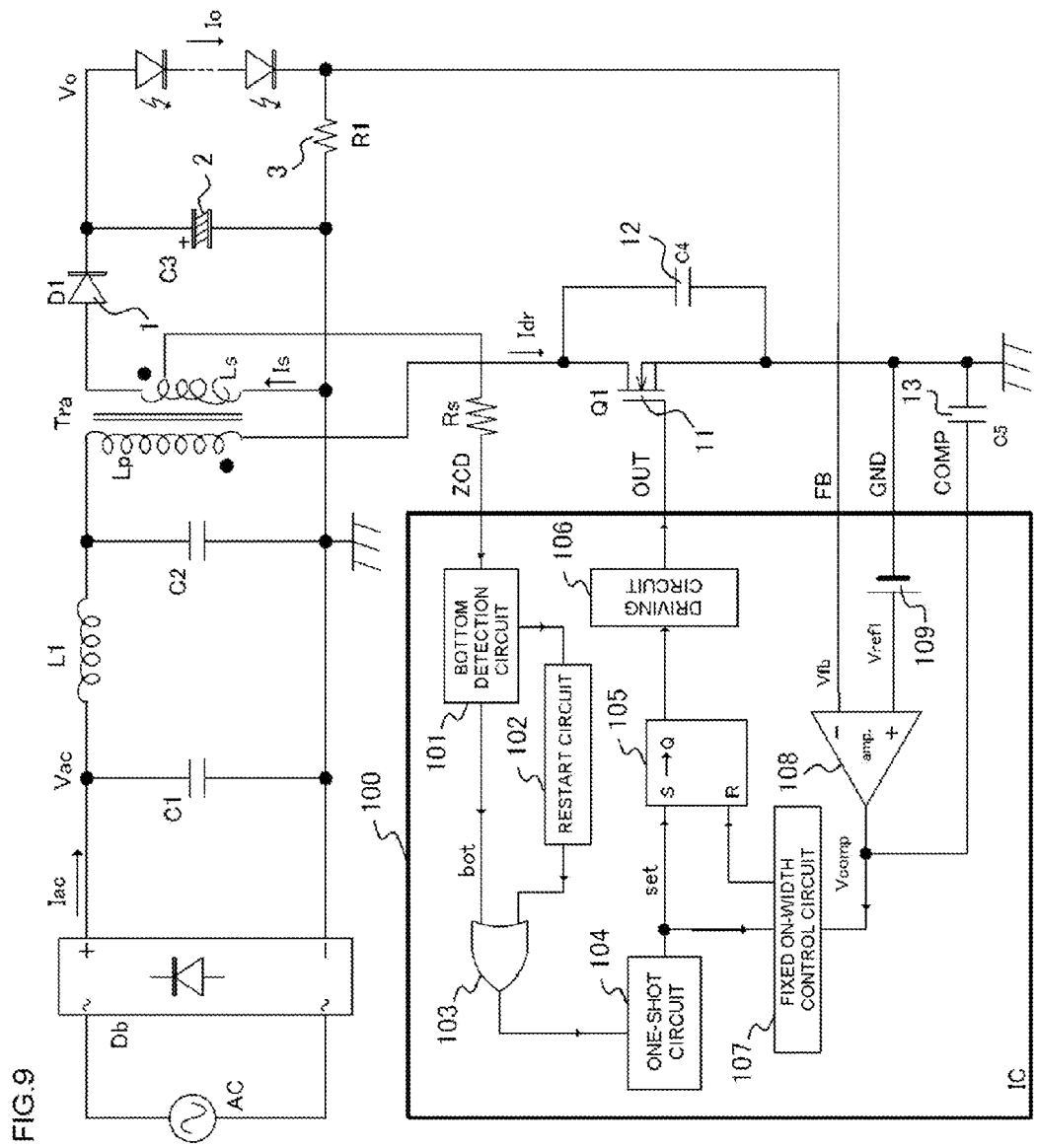
FIG.9 A CONSTRUCTION OF A CONVENTIONAL SINGLE STAGE SWITCHING REGULATOR WITH QUASI-RESONANT SWITCHING CONTROL HAVING A FIXED ON-WIDTH CONTROL FUNCTION FIG.10 THE WAVEFORMS OF THE LINE VOLTAGE VAC AND
THE LINE CURRENT IAC INDICATED IN THE INPUT PART
OF THE SWITCHING REGULATOR OF FIG. 9
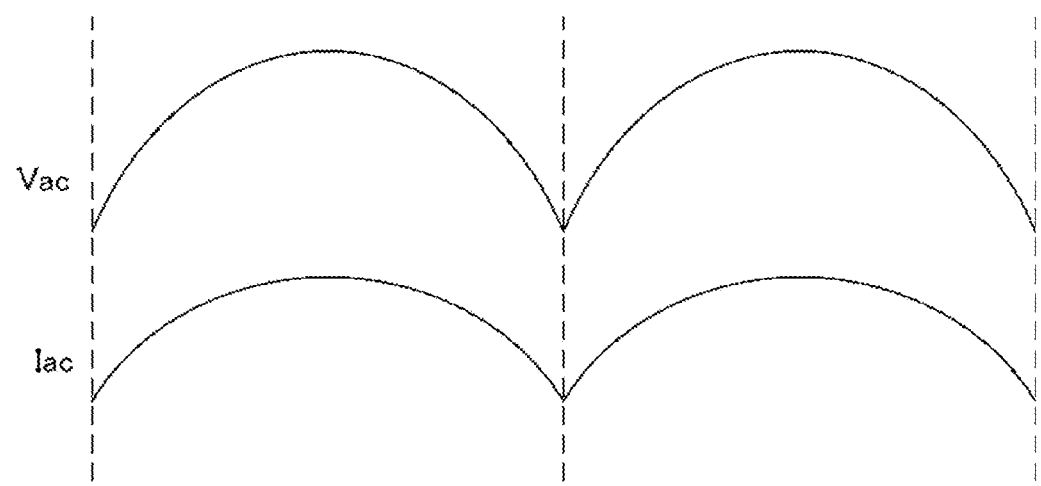

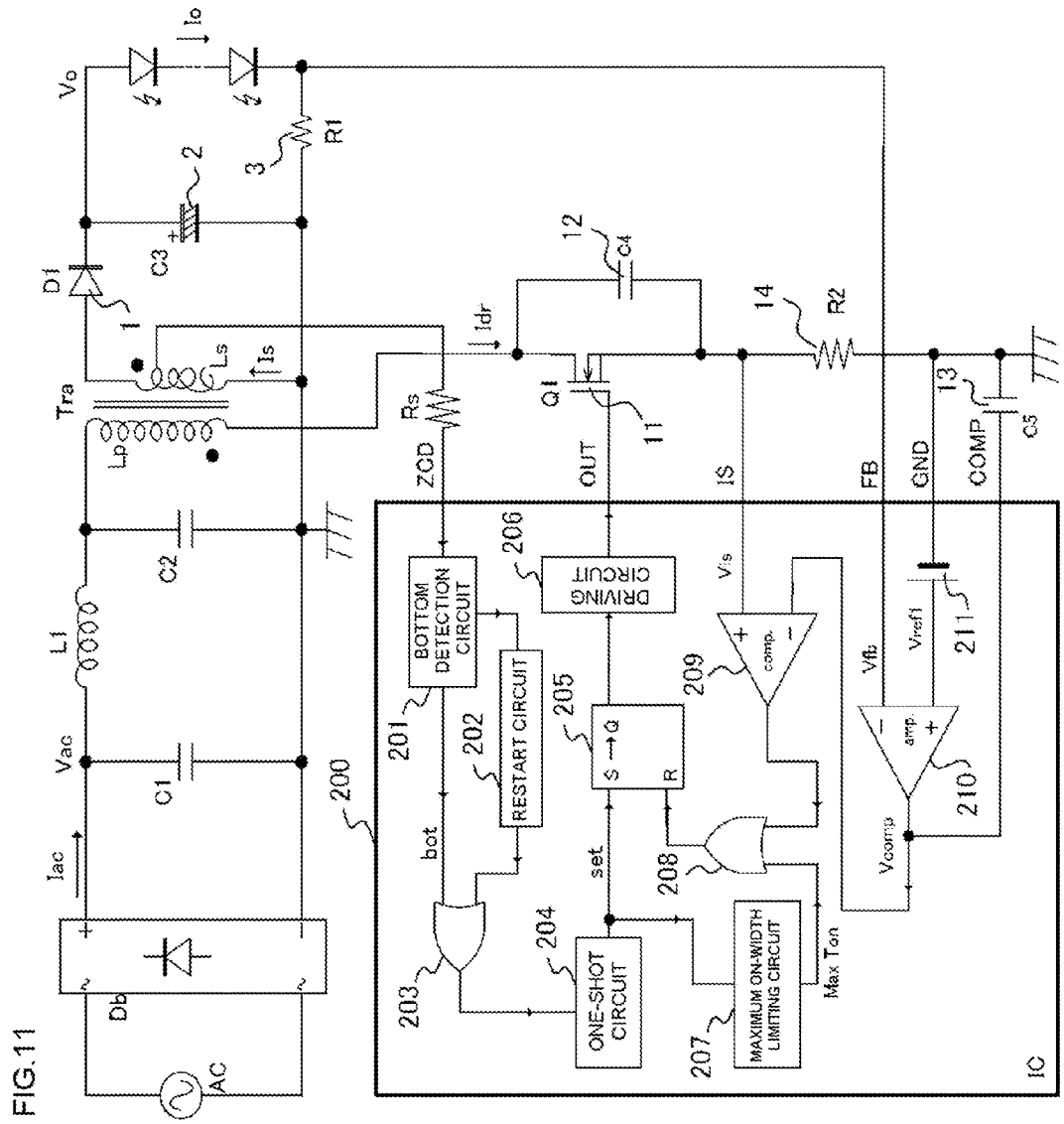
FIG.11 A CONSTRUCTION OF A CONVENTIONAL SINGLE STAGE SWITCHING REGULATOR WITH QUASI-RESONANT SWITCHING CONTROL HAVING A FIXED PEAK CURRENT CONTROL FUNCTION FIG.12 THE WAVEFORMS OF THE LINE VOLTAGE VAC AND THE LINE CURRENT IAC INDICATED IN THE INPUT PART OF THE SWITCHING REGULATOR OF FIG. 11
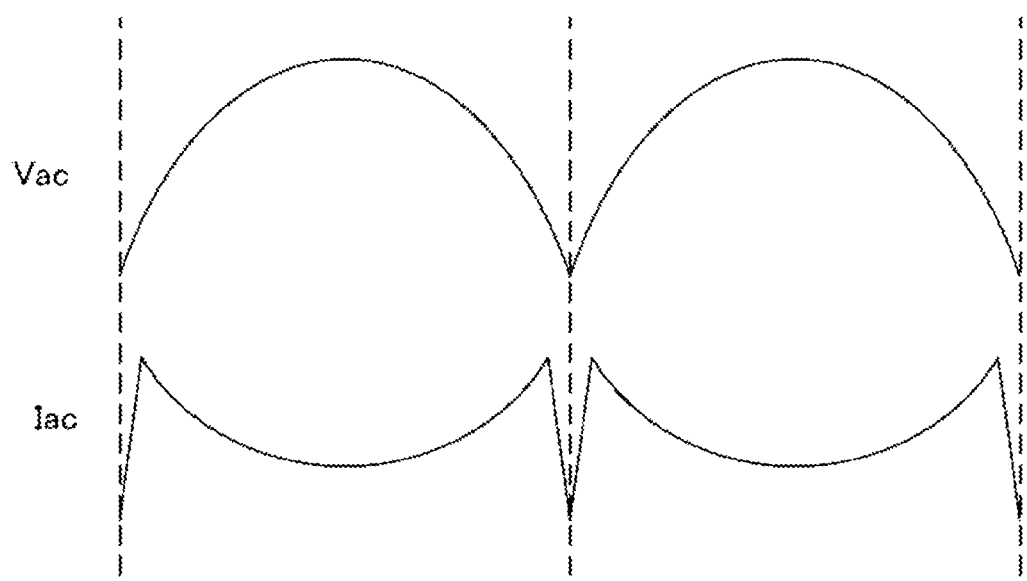

SWITCHING REGULATOR CONTROL CIRCUIT

BACKGROUND OF THE INVENTION

1. Field of the Invention

Embodiments of the present invention are related to switching regulator control circuits, and, in particular, switching regulator control circuits for driving semiconductor elements, such as light emitting diodes.

2. Description of the Related Art

As is well known in the field of LED (light emitting diode) illumination, current supply devices to supply stable current are required in order to light LED lamps stably. For current supply devices, which need high efficiency and high power factor, generally used are switching regulators of a single stage power factor correction (PFC) type with a PFC converter and a DC-DC converter combined together into a converter structure. This type of switching regulator is controlled with a control IC for example, Type FA5601 control IC manufactured by Fuji Electric Co., Ltd.

For the purpose of reducing a switching loss at turning-on, a discontinuous conduction mode is generally employed, and used is a fixed on-width control, in which an on-width is held constant during the control process, the on-width being the time duration a switching element is in an on-state in each switching period. The Type FA5601 control IC mentioned above, for example, can perform this control.

FIG. 9 shows a construction of a conventional single stage switching regulator (that is, a converter) for fixed on-width control using a quasi-resonant switching process. FIG. 10 shows line voltage Vac waveform and a line current Iac waveform supplied to the input part of the switching regulator shown in FIG. 9. In the switching regulator shown in FIG. 9, the AC power from an AC power source AC is rectified by a diode bridge Db and the obtained line voltage Vac and the line current Iac are fed to the primary winding Lp of a transformer Tra. The secondary current Is induced in the secondary winding Ls of the transformer Tra is rectified and smoothed by a diode D1 (1) and an output capacitor C3 (2) and a resulting DC output voltage Vo is supplied to a load (that is a set of LEDs).

The line voltage Vac shown in FIG. 10 in the input part of the switching regulator of FIG. 9 is represented by the following equation (1).

$$Vac = V1 * \sin\theta \quad (1)$$

where V1 is a constant and θ is a variable indicating a phase angle in the range of 0 to 180 degrees. The symbol '*' represents multiplication operation.

A power factor PF is usually represented by: power factor PF=effective power Pr/apparent power Pa. The effective power Pr and the apparent power Pa can be given by the following equations (2) and (3).

$$Pr = \int_0^\pi Vac * Iac * d\theta \quad (2)$$

$$Pa = \sqrt{\int_0^\pi Vac^2 * d\theta * \int_0^\pi Iac^2 * d\theta} \quad (3)$$

During switching operation of the switching element Q1 (11) connected to the primary winding Lp of the transformer Tra shown in FIG. 9, the peak value Idrp of the drain current Idr running through the drain of Q1 is represented by $$Idrp = Vac * Ton/Lp \quad (4),$$

where Ton is an on-width and Lp is an inductance of the primary winding of the transformer Tra. Here, it is assumed that the inductance L1 of the low-pass filter (composed of the inductance L1 and capacitors C1 and C2) in the primary side of the transformer Tra and the voltage drop through the switching element Q1 (11) are negligibly small. The peak value Idrp, here, is a peak value of the drain current in one switching period.

Because of the filtering function of the low-pass filter in the primary side of the transformer Tra, a line current Iac is the peak value Idrp of the drain current averaged over the switching periods, and given by the following equation.

$$Iac = \tfrac{1}{2} Idrp * D \quad (5),$$

where D is a duty factor (or on-duty or simply, a duty).

The duty factor D is given by the equation (6) below and the Idrp is given by the equation (4) above. The secondary current Is induced in the secondary winding Ls of the transformer Tra is represented by the equations (7) and (8) below. In the equation (8), Toff is a time duration in the switching period in which the switching element is in the off-state, or an 'off-width' of the switching element.

$$D = Ton/(Ton + Toff) \quad (6)$$

$$Is = N * Idrp \quad (7),$$

where N is a turn ratio of the transformer.

$$Is = Vo * Toff/Ls \quad (8)$$

where Ls is an inductance of the secondary winding and Vo is an output voltage obtained in the secondary side of the transformer Tra.

$$N * N = Lp/Ls \quad (9)$$

Transforming the equation (4), the following equation is obtained.

$$Ton = Idrp \, Lp/Vac \quad (10)$$

Using the equations (7) and (8), $$Toff = Is * Ls/Vo = N * Idrp * Ls/Vo \quad (11)$$

Substituting the equations (10) and (11) into the equation (6), $$\begin{aligned} D &= Ton/(Ton + Toff) = (Lp/Vac)/(Lp/Vac + N * Ls/Vo) \quad (12)\\ &= Lp * Vo/(Vo * Lp + N * Ls * Vac)\\ &= (Lp/Ls) * Vo/((Lp/Ls) * Vo + N * Vac) \end{aligned}$$

Substituting the equation (9) into the equation (12), $$D = N*N*Vo/(N*N*Vo+N*Vac) = N*Vo/(N*Vo+Vac) \quad (13)$$

It is assumed that a resonance period caused by the inductor L1 in the low-pass filter in the primary side of the transformer Tra and the capacitor C4 (12) connected parallel to the switching element Q1 can be ignored. It is also assumed that the voltage drop through the diode D1 (1) in the secondary side of the transformer Tra is negligibly small.

Therefore, the line current Iac is given by the following equation.

$$Iac = \tfrac{1}{2} * Vac * Ton/Lp * Vo * N/(Vo * N + Vac) \quad (14)$$

Because of the fixed on-width control in this embodiment example, the line current Iac can be given as a function of the line voltage Vac as shown in FIG. 10, and has a nearly sinusoidal waveform. Since the fixed on-width control is assumed, calculation of a power factor PF substituting this expression into the equations (2) and (3) gives a power factor PF value of approximately 1. A calculation taking line voltage dependence into consideration gives generally a power factor PF value in the range of 0.95 to 0.99. If the Vac in the term (Vo*N+Vac) in the equation (14) is neglected, the power factor PF value turns out to be 1.0.

The bottom detection circuit 101 in the control circuit 100 of the switching regulator of FIG. 9 detects a bottom (a minimum) of resonant oscillation current in the primary side of the transformer Tra. The energy stored in the transformer Tra in the on-state of the switching element Q1 (11) is transferred to the secondary side in the off-state of the switching element Q1 (11) until completion of the transfer, at which the resonant oscillation in the primary side begins. The current Is that is proportional to the resonant oscillation current flows to the resistance Rs from the secondary winding Ls, and converted to a voltage on the resistance Rs. This voltage is delivered to the bottom detection circuit 101 that detects a bottom of the delivered voltage to detect the bottom of the resonant oscillation current. An output signal 'bot' from the bottom detection circuit 101, indicating arrival ata bottom of the resonant oscillation current, turns to a high level during a short time upon detection of the bottom. When the signal 'bot' is delivered through an OR circuit 103 to a one-shot circuit 104, the next switching period begins.

Because a line power is determined by multiplying the line voltage Vac and the line current Iac together, the line power obtained is very small in a low phase region near the phase angle of zero degrees or 180 degrees, and the line power is large in a high phase region. As a result, large oscillation occurs in the line power, causing a substantial ripple of output current Io. To suppress this ripple within a certain limit, an electrolytic output capacitor C3 (2) of a large capacitance is required. For example, the LED lamp specification of 21 V/350 mA needs a capacitance of the C3 (2) of 500 to 1,000 µF.

Because a power supply board for an LED lamp is contained in the LED lamp, the size of the output electrolytic capacitor is an obstacle against downsizing of an LED system. Consequently, the capacitance of the capacitor C3 (2) must be reduced. This needs suppressing oscillation of the line power. For this purpose, a fixed peak current control scheme is employed in which the peak value Idrp of the drain current is kept constant. The control IC FA 5601 mentioned previously, for example, can fit to the fixed peak current control scheme.

FIG. 11 shows a construction of a conventional single stage, power factor correction type switching regulator (that is a converter) for a fixed peak current control scheme employing quasi-resonant switching method. The line current Iac in this case is represented as follows using the equations (5) and (13).

$$Iac = \frac{1}{2} * Idrp * Vo * N / (Vo * N + Vac) \qquad (15)$$

The line current Iac is nearly in inverse proportion to the line voltage Vac in the input part of the switching regulator, and has an approximately inverse sinusoidal waveform as shown in FIG. 12. The fixed peak current control scheme used in the switching regulator of FIG. 11 greatly suppresses the oscillation in the line power and reduces the capacitance of the output electrolytic capacitor C3 (2) to about a half. A power factor, however, deteriorates to about 0.6. Although a design to achieve a power factor PF of about 0.9 is possible by introducing a maximum on-width control scheme, the design involves a problem of great dependency on the input voltage. For example, the design that provides a power factor PF of 0.87 owing to adjustment by the maximum on-width control in the case of an input line voltage Vac of 100 Vrms results in a power factor PF of 0.67 in the case of an input line voltage Vac of 230 Vrms.

The output signal 'bot' from the bottom detection circuit 201 in the control circuit 200 of the switching regulator of FIG. 11, indicating, like the signal 'bot' in FIG. 9, arrival at a bottom of the resonant oscillation current, turns to a high level during a short time upon detection of the bottom. When the signal 'bot' is delivered through an OR circuit 203 to a one-shot circuit 204, the next switching period begins.

Japanese Unexamined Patent Application Publication No. 2007-080771 (also referred to herein as "Patent Document 1") discloses a circuit to control the current running in LEDs constant. Japanese Unexamined Patent Application Publication No. 2002-352980 (also referred to herein as "Patent Document 2") discloses a circuit to control the current running in a mercury lamp to equalize always to the rated current. Both the Patent Documents 1 and 2 disclose a technology falling into the fixed peak current control scheme mentioned previously in which the peak current Idrp is controlled constant.

SUMMARY OF THE INVENTION

In the traditional technologies described above, power factor improvement contradicts capacitance reduction in an output capacitor. As such, Embodiments of the present invention provide a switching regulator control circuit that achieves both power factor enhancement and capacitance reduction in an output capacitor. Embodiments of the present invention also provide a switching regulator provided with such a switching regulator control circuit.

Embodiments of the present invention provide a switching regulator control circuit of a switching regulator of a power factor correction type that has a switching element connected to a primary winding of a transformer and supplies a load with a predetermined output power from a secondary winding of the transformer, the switching regulator control circuit comprising: a means for supplying line current obtained by rectifying AC power from an AC power supply to the primary winding of the transformer; a means for generating a switching instruction signal to turn-on the switching element connected to the primary winding; a means for detecting a current value of a drain current flowing in the switching element in a path of the line current flowing to the ground; a means for detecting an on-width of the switching element and calculating a duty factor, the detecting an on-width being carried out based on the switching instruction signal; a means for operating multiplication between the detected current value of the drain current and the calculated duty factor; a means for generating an error signal by amplifying a deference between a feedback signal from the load and a reference voltage; and a means for turning-off the switching element when the multiplication result and the error signal have become coincident.

In a switching regulator control circuit of an embodiment of the present invention, the switching regulator control circuit further comprises a maximum on-width limiting circuit that limits a maximum on-width of the switching element.

In a switching regulator control circuit of an embodiment of the present invention, the switching instruction signal to the switching element is generated based on quasi-resonant control that controls turning-on of the switching element to be conducted at the timing when the current flowing in the primary winding of the transformer is a minimum.

In a switching regulator control circuit of an embodiment of the present invention, the switching instruction signal to the switching element is generated based on a fixed oscillation frequency generated by an oscillator circuit.

Another embodiment of the present invention provides a switching regulator control circuit of a switching regulator of a power factor correction type that has a switching element connected to a primary winding of a transformer and supplies a load with a predetermined output power from a secondary winding of the transformer, the switching regulator control circuit comprising: a means for supplying line current obtained by rectifying AC power from an AC power supply to the primary winding of the transformer; a means for generating a switching instruction signal to turn-on the switching element connected to the primary winding; a means for detecting a current value of a drain current flowing in the switching element in a path of the line current flowing to the ground; a means for detecting an on-width of the switching element based on the switching instruction signal; a means for operating multiplication between the detected current value of the drain current and the detected on-width of the switching element; a means for generating an error signal by amplifying a deference between a feedback signal from the load and a reference voltage; and a means for turning-off the switching element when the multiplication result and the error signal have become coincident.

In a switching regulator control circuit of an embodiment of the present invention, the switching regulator control circuit further comprises a maximum on-width limiting circuit that limits a maximum on-width of the switching element.

In a switching regulator control circuit of an embodiment of the present invention, the switching instruction signal to the switching element is generated based on a fixed oscillation frequency generated by an oscillator circuit.

Embodiments of the present invention also provide a switching regulator comprising any one of the switching regulator control circuits as stated above.

Embodiments of the present invention also provide a switching regulator control circuit having an output capacitor of a small capacitance and exhibiting a high power factor independent of line voltage (input voltage).

BRIEF DESCRIPTION OF DRAWINGS

FIG. 5 shows a construction of a single stage switching regulator (that is a converter) of a power factor correction type with fixed switching frequency control having a fixed line current control function of a second embodiment according to the present invention;

FIG. 6 is a timing chart showing waveforms, in the phase regions A, B, and C indicated in FIG. 2, of Vac, Max Ton, Dry at the terminal OUT, Vd, Idr, Vdr, and Iac in the second embodiment according to the present invention;

FIG. 7 shows a construction of a single stage switching regulator (that is a converter) of a power factor correction type with fixed switching frequency control having a fixed line current control function of a third embodiment according to the present invention;

FIG. 8 is a timing chart showing waveforms, in the phase regions A, B, and C indicated in FIG. 2, of Vac, Max Ton, Dry at the terminal OUT, Vd, Idr, Vdr, and Iac in the third embodiment according to the present invention;

FIG. 9 shows a construction of a conventional single stage switching regulator with quasi-resonant switching control having a fixed on-width control function;

FIG. 10 shows the waveforms of the line voltage Vac and the line current Iac indicated in the input part of the switching regulator of FIG. 9;

FIG. 11 shows a construction of a conventional single stage switching regulator with quasi-resonant switching control having a fixed peak current control function; and FIG. 12 shows the waveforms of the line voltage Vac and the line current Iac indicated in the input part of the switching regulator of FIG. 11.

DETAILED DESCRIPTION

Below, some embodiments according to the present invention will be described in detail in the following with reference to the accompanied drawings.

[First Embodiment]

Figure 1:
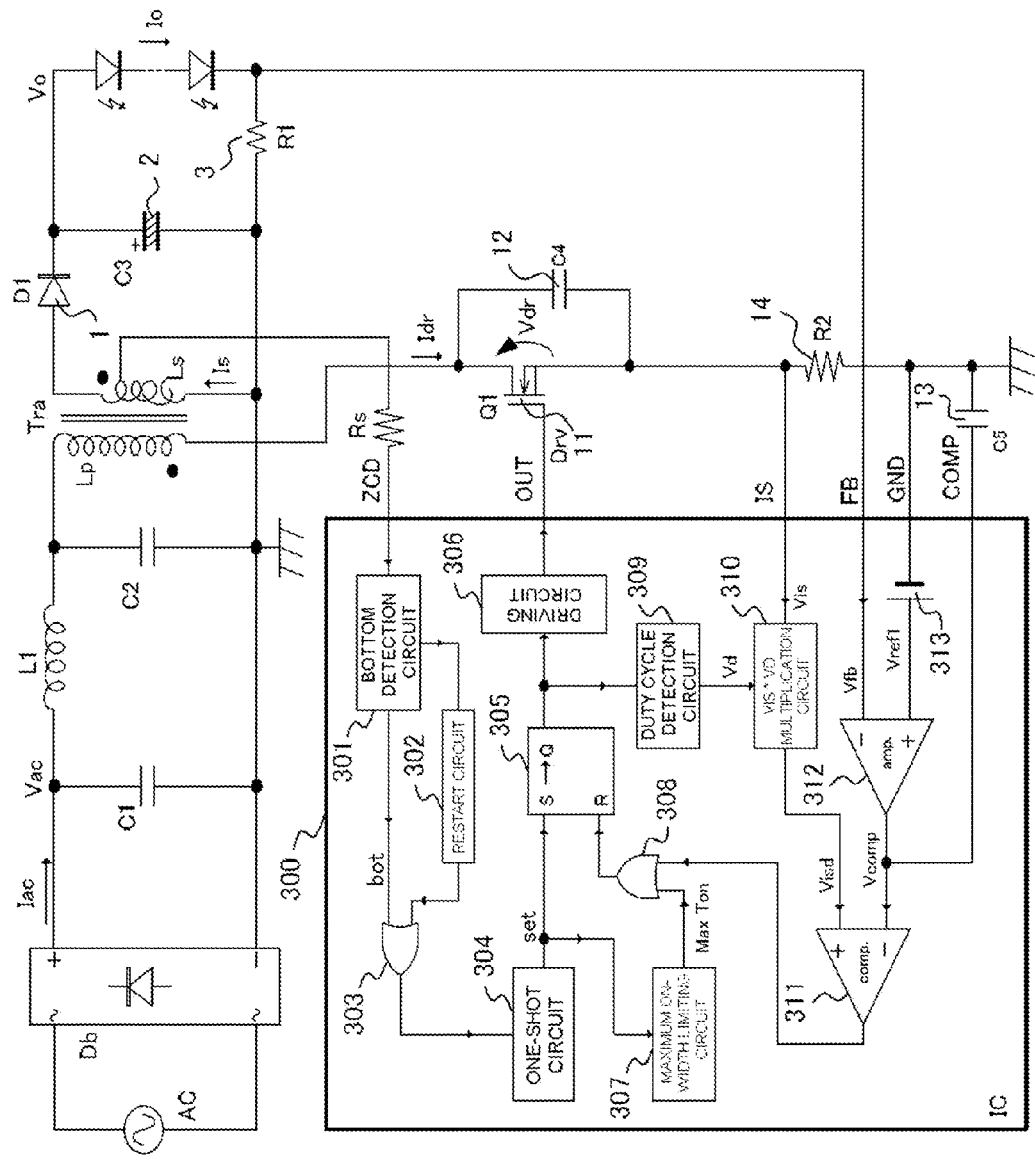
FIG. 1 shows a construction of a single stage switching regulator (that is, a converter) of a power factor correction type with quasi-resonant switching control having a fixed line current control function of a first embodiment according to the present invention.

FIG. 1 shows a construction of a single stage switching regulator (that is, a converter) of a power factor correction type with quasi-resonant switching control having a fixed line current control function of a first embodiment according to the present invention. Operation of the switching regulator (that is a converter) of the first embodiment according to the present invention is described for each operation items referring to FIG. 1. In the switching regulator shown in FIG. 1, an AC output from an AC power supply AC is rectified by a diode bridge Db and resulting line voltage Vac and line current Iac are supplied to a primary winding Lp of a transformer Tra. A secondary side current Is induced in a secondary winding Ls of the transformer Tra is rectified by a diode D1 (1) and an output capacitor C3 (2) and a resulting DC output voltage Vo is supplied to a load that is a set of LEDs.

(1) Turning ON

A bottom detection circuit (or a valley detection circuit) 301 receives a voltage at a ZCD (zero current detection) terminal from the series circuit of the secondary winding Ls of the transformer Tra and a resistance Rs and detects a bottom of resonant oscillation current that begins to occur after completion of energy release from the transformer Tra. The bottom detection circuit 301, upon detecting the bottom, delivers a bottom detection signal 'bot' at a high level through an OR circuit 303 to the one-shot circuit 304. When the bottom detection circuit 301 cannot detect the bottom of the drain voltage, a Restart circuit 302 delivers, instead of the bottom detection circuit, a turn ON instruction at a high level through the OR circuit 303 to the one-shot circuit 304.

When the high level signal is delivered to the one-shot circuit 304 through the OR circuit 303, the one-shot circuit 304 delivers a pulse signal at a high level to the flip-flop 305, which is set and outputs a high level signal, a 0 output, from the Q terminal thereof. When the Q output of the flip-flop 305 becomes a high level, the high level signal is given to the gate of the switching element Q1 (11) through a driving circuit 306 to turn-on the switching element Q1 (11).

(2) Turning OFF

A switching element Q1 (11) is connected to a primary winding Lp of the transformer Tra in the switching regulator shown in FIG. 1. The drain current Idr of the switching element Q1 (11) flows through a resistance R2 (14) that is connected between the source terminal of the switching element Q1 (11) and the ground. The drain current Idr is converted with the resistance R2 (14) into a current sense voltage Vis=Idr*R2. The voltage Vis is delivered to a Vis*Vd multiplication circuit 310 in a control circuit 300 of the switching regulator of FIG. 1 through a terminal IS of the control circuit 300. The other input voltage Vd to the Vis*Vd multiplication circuit 310 is generated in a duty factor detection circuit 309. The duty factor detection circuit 309 detects a duty factor D based on a Q output of the flip-flop 305 and generates the voltage Vd, a signal proportional to the duty factor D. The voltage Vd is thus expressed by Vd=K1*D, where K1 is a constant. The multiplication circuit 310 conducts multiplication operation between the voltage Vis proportional to the drain current Idr and the voltage Vd proportional to the duty factor D.

The Vd to the Vis*Vd multiplication circuit 310 generates a voltage Visd, which is proportional to the drain current Idr. The voltage Visd is expressed by Visd=R2* K1*Idr*D based on the equations given above.

The voltage Visd is delivered to a comparator circuit 311. The other input terminal of the comparator circuit 311 receives an error signal Vcomp, which is compared with the voltage Visd. When the voltage Visd reaches the error signal Vcomp, the comparator circuit 311 delivers a turn-off instruction through an OR circuit 308 to a reset terminal R of the flip-flop 305. A maximum on-width-limiting circuit 307 storing a maximum on-width is also connecting to the OR circuit 308. The maximum on-width-limiting circuit 307 delivers a signal when a time period of the maximum on-width has elapsed after reset by an output signal from the one-shot circuit 304. If the signal is delivered before the voltage Visd reaches the error signal Vcomp, the maximum on-width limiting circuit 307 delivers the turn-off signal through the OR circuit 308 to the reset terminal R of the flip-flop 305.

When the voltage Visd reaches the error signal Vcomp, Vcmop=Visd, which gives an equation Vcomp=R2*K1*Idrp*D. According to the equation (5), Idrp*D=2*Iac, which leads to a relationship between the error signal Vcomp and the line current Iac: Iac=Vcomp/(2−R2*K1). This means that the line current Iac is proportional to the error signal Vcomp.

(3) Feedback Loop

The current running through the load LEDs, an LED current Io, is converted with a resistance R1 (3) to a feedback voltage Vfb proportional to the current Io. The feedback voltage Vfb is delivered through an FB terminal to an operational amplifier 312 in the control circuit 300 of the switching regulator of FIG. 1. The operational amplifier 312 also receives a reference voltage Vref1 from a reference voltage source 313. The operational amplifier 312 amplifies the difference between the feedback voltage Vfb and the reference voltage Vref1 and generates the error signal Vcomp. The control circuit is so constructed that the switching element Q1 (11) turns off when the Visd, which is generated in the multiplication circuit 310 and proportional to the drain current Idr, reaches the Vcomp. Therefore, when the feedback voltage Vfb is larger than the reference voltage Vref1, the error signal Vcomp decreases, which results in turning-off of the switching element Q1 (11) as described earlier, causing decrease in the on-width and eventually decrease in the drain current Idr. When the feedback voltage Vfb is smaller than the reference voltage Vref1, the error signal Vcomp increases, which causes increase in the on-width and eventually increase in the drain current Idr. Thus, the error signal Vcomp settles to a value corresponding to the feedback voltage Vfb equal to the reference voltage Vref1. Consequently, the line power is controlled so as to make the LED current Io constant. A capacitor C5 (13) is provided in order to prevent the error signal Vcomp from being affected by the ripple on the feedback voltage Vfb. The capacitor 5 (13) has a capacitance of about 1 μF.

(4) Duty Factor Detection Circuit

In this specification, a switching cycle to determine the drain current is called a present cycle. A cycle adjacent to a certain cycle is called an adjacent cycle. An adjacent cycle before the present cycle is called a previous cycle. A switching period is generally about ten and several microseconds in the switching regulators (that are converters) of the embodiments according to the present invention, whereas the period of the line voltage Vac is ten and several milliseconds. Therefore, the line voltages of the adjacent cycles are virtually equal to that of the present cycle. The duty factor D expressed by the equation (13) is also substantially equal to that of the adjacent cycle. Consequently, the duty factor detection circuit 309 can use the voltage Vd that has been obtained and held in the previous cycle as a voltage Vd in the present cycle since the voltage Vd is proportional to the duty factor D.

The bottom detection circuit 301 in the control circuit 300 of the switching regulator of FIG. 1 detects a bottom (the minimum) of the resonant oscillation current in the primary side of the transformer Tra. The energy that has been stored in the transformer Tra during the on-state of the switching element Q1 (11) is transferred to the secondary side during the off-state of the switching element Q1 (11). When the transfer is completed, resonant oscillation begins in the primary side. The current Is that is proportional to the resonant oscillation current flows from the secondary winding Ls through the resistance Rs. The current in the resistance Rs is converted to a voltage and delivered to the bottom detection circuit 301. The bottom detection circuit 301 detects a bottom of the received voltage and thus performs bottom detection of the resonant oscillation current. The output signal 'bot' from the bottom detection circuit 301 becomes a high level for a short time upon detection of a bottom in the bottom detection circuit 301. This signal is delivered to the one-shot circuit 304 through an OR circuit 303. The one-shot circuit 304, upon receiving the signal, delivers a set signal 'set' to a set input terminal S of the flip-flop 305 to start the next switching period.

Figure 2:
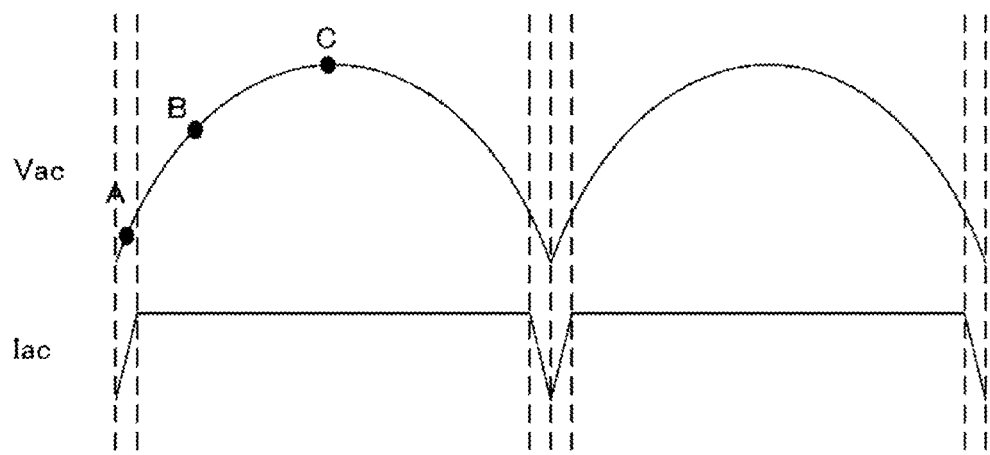
FIG. 2 shows the waveforms of the line voltage Vac and the line current Iac indicated in FIG. 1, the symbols A, B, and C indicating the voltages Vac at these different phase angles.
Figure 4:
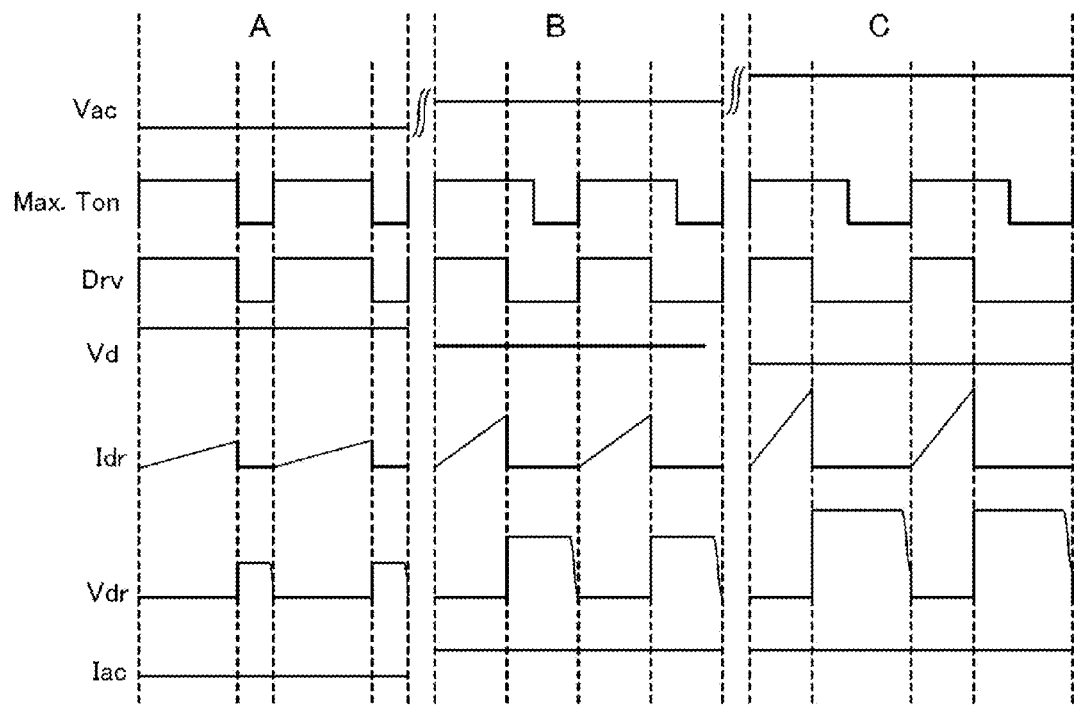
FIG. 4 is a timing chart showing waveforms, in the phase regions A, B, and C indicated in FIG. 2, of Vac, Max Ton, Dry at the terminal OUT, Vd, Idr, Vdr, and Iac in the first embodiment according to the present invention.

FIG. 2 shows the waveforms of the line voltage Vac and the line current Iac indicated in FIG. 1, the symbols A, B, and C indicating the voltages Vac at these different phase angles. FIG. 4 is a timing chart showing waveforms, in the phase regions A, B, and C indicated in FIG. 2, of Vac, Max Ton, Dry at the terminal OUT, Vd, Idr, Vdr, and Iac in the first embodiment according to the present invention. The phase region A is a maximum on-width limited region controlled by a maximum on-width limiting circuit 307. In this phase region A, the output signal from the maximum on-width limiting circuit 307 becomes a high level before the output signal from the comparator circuit 311 becomes a high level. Therefore, the line current Iac is smaller than the level that is determined by the error signal Vcomp. In the phase region B and the phase region C, the output signal from the comparator circuit 311 becomes a high level before the output signal from the maximum on-width limiting circuit 307 becomes a high level, and the maximum on-width limitation does not function. Therefore, the line current Iac is determined by the error signal Vcomp and kept at a constant value.

Figure 3:
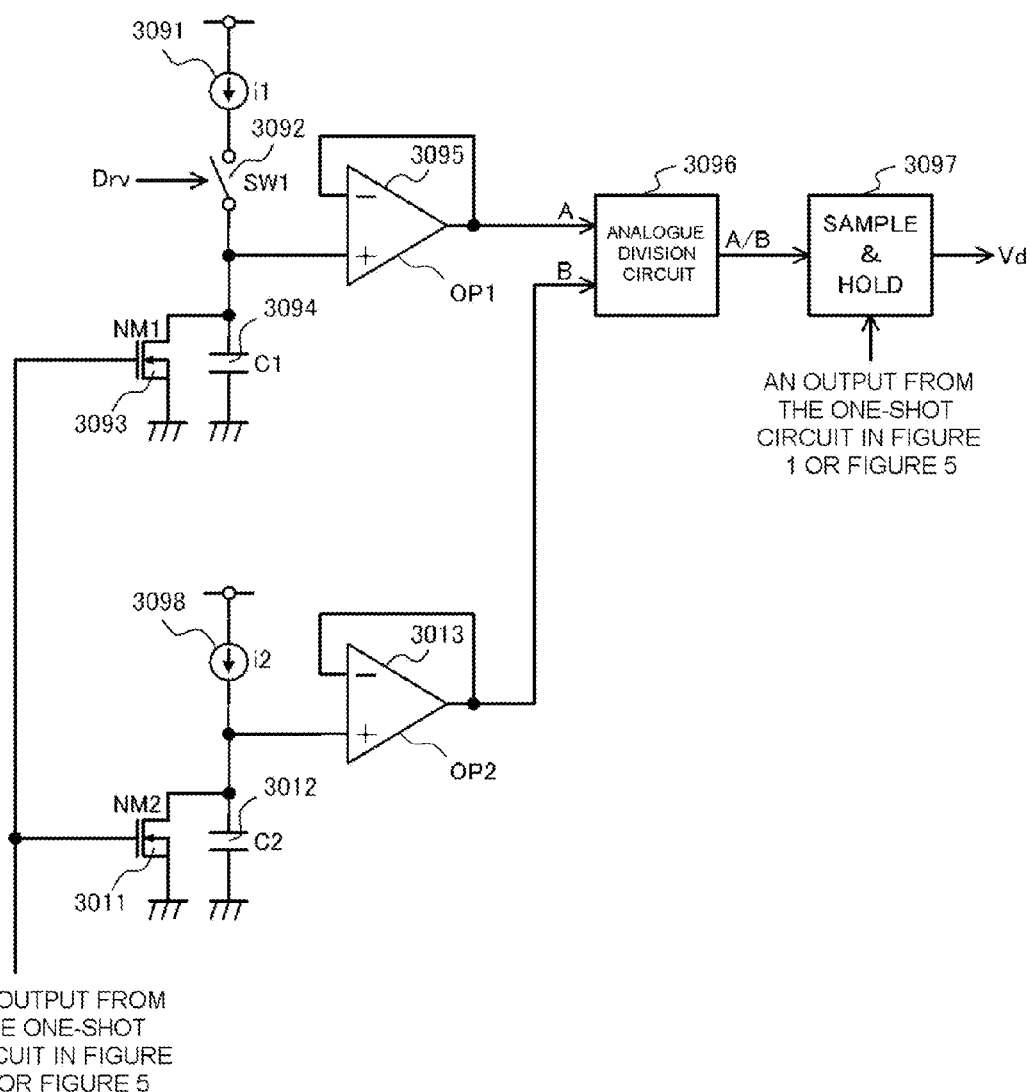
FIG. 3 shows an example of a duty factor detection circuit used in the first embodiment according to the present invention.

FIG. 3 shows an example of a duty factor detection circuit used in the first embodiment according to the present invention. During an on-state of the switching element Q1 (11) shown in FIG. 1, a SW1 (3092) in FIG. 3 is closed and a constant current source 3091 supplies a constant current i1 to a capacitor C1 (3094) that is parallel connected to an N-channel MOS transistor NM1 (3093). Since this voltage across the capacitor C1 (3094) is proportional to the on-time of the switching element Q1 (11), the on-time is converted to a voltage. The output signal from the one-shot circuit 304 in FIG. 1 (also the output signal from the one-shot circuit 402 in FIG. 5 as described later) sets the flip-flop 305 (the flip-flop 403) to turn-on the switching element Q1 (11). Thus, the period of the output signal from the one-shot circuit 304 (402) is the switching period. During the switching period, a constant current source 3098 supplies a constant current i2 to a capacitor C2 (3012) that is parallel connected to an N-channel MOS transistor NM2 (3011) to convert the switching period to a voltage. The output signal from the one-shot circuit 304 (or 402) in FIG. 1 (or FIG. 5) turns-on the N-channel MOS transistors NM1 (3093) and NM2 (3011) for a short time at every switching period to discharge the capacitors C1 (3094) and C2 (3012) and clear the voltages of the capacitors to zero. The operational amplifiers OP1 (3095) and OP2 (3013) each composes a voltage follower. The voltages of the capacitors C1 (3094) and C2 (3012), after converted to impedances by the voltage followers, are delivered to an analogue division circuit 3096, in which divisional operation is executed to generate and output a signal corresponding to the factor of (on-time/switching period). The output signal from the analogue divisional circuit 3096 is sampled and held in a sampling and holding circuit 3097 corresponding to the output from the one-shot circuit 304 in FIG. 1 (or 402 in FIG. 5) triggered by rise up of the signal 'bot' and outputted as a signal Vd.

The capacitors C1 (3094) and C2 (3012) are reset by turning-on of the N-channel MOS transistors NM1 (3093) and NM2 (3011) receiving the output signal from the one-shop circuit 304 in FIG. 1 (or 402 in FIG. 5) triggered by turning to a high level of the signal 'bot'. This resetting operation of the capacitors C1 (3094) and C2 (3012), however, does not cause the sampling and holding circuit 3097 to read-in a wrong signal, owing to delay in the circuit.

[Second Embodiment]

FIG. 5 shows a construction of a single stage switching regulator (that is a converter) of a power factor correction type with fixed switching frequency control having a fixed line current control function of a second embodiment according to the present invention. In the switching regulator shown in FIG. 5, as in the switching regulator shown in FIG. 1, an AC output from an AC power supply AC is rectified by a diode bridge Db and resulting line voltage Vac and line current Iac are supplied to a primary winding Lp of a transformer Tra. A secondary side current Is induced in a secondary winding Ls of the transformer Tra is rectified by a diode D1 (1) and an output capacitor C3 (2) and a resulting DC output voltage Vo is supplied to a load that is a set of LEDs.

The following describes the points where operation of the switching regulator (that is a converter) of FIG. 5 is different from the operation of the switching regulator of the first embodiment according to the present invention shown in FIG. 1. In the operation of the control circuit 400 of the switching regulator of FIG. 5, an oscillator circuit (OSC circuit) 401 generates and delivers a square wave with a constant period to the one-shot circuit 402. The one-shot circuit 402, receiving the square wave, delivers a set signal 'set' to the set input terminal S of the flip-flop 403 to start the next switching period. The switching period in this operation is equal to the constant period of the square wave from the oscillator circuit 401. Thus, the switching frequency is fixed in this second embodiment.

FIG. 6 is a timing chart showing waveforms, in the phase regions A, B, and C indicated in FIG. 2, of Vac, Max Ton, Dry at the terminal OUT, Vd, Idr, Vdr, and Iac in the second embodiment according to the present invention;

[Third Embodiment]

FIG. 7 shows a construction of a single stage switching regulator (that is a converter) of a power factor correction type with fixed switching frequency control having a fixed line current control function of a third embodiment according to the present invention. The following describes the point where operation of the switching regulator (that is a converter) of FIG. 7 is different from the operation of the switching regulator of the second embodiment according to the present invention shown in FIG. 5. In the operation of the control circuit 500 of the switching regulator of FIG. 7, an on-width detection circuit 507 is used in place of the duty factor detection circuit 407 in FIG. 5. As a consequence, it is unnecessary to hold the information of previous cycle, which is the voltage Vd proportional to the duty factor D.

In explaining this point using the equation (5), since the duty factor D=Ton/T, the line current Iac is expressed as follows.

$$Iac = \tfrac{1}{2} * Idrp * D = 1/(2*T) * Idrp * Ton \quad (16)$$

where T is a switching period and Ton is an on-width. The switching period T is constant because the oscillator circuit 501 oscillates at a fixed frequency. Therefore, the line current Iac is proportional to the product of Idrp and Ton as the equation (16) indicates.

By defining Von as Von=K2*Ton, where K2 is a constant, and modifying the equation (16), the equation 2*T*Iac=Idrp* Ton is obtained. From the operation in the Vis*Von multiplication circuit 508, the following equation is obtained.

$$Vison = Vis * Von = Idrp * R2 * K2 * Ton = R2 * K2 * 2 * T * Iac.$$

When Vison=Vcomp, the line current Mc=Vcomp/(2*T*R2*K2).

FIG. 8 is a timing chart showing waveforms, in the phase regions A, B, and C indicated in FIG. 2, of Vac, Max Ton, Dry at the terminal OUT, Vd, Idr, Vdr, and Iac in the third embodiment according to the present invention;

Some remarks concerning the second and third embodiments are given in the following. In the second and third embodiments, the switching frequency is fixed and zero current detection (ZCD) is not conducted while the ZCD is conducted in the first embodiment. The basic concept of certain embodiments of the present invention is a critical conduction mode or a discontinuous continuous mode, in which the current in the transformer returns to zero at every switching period. The first embodiment uses the critical conduction mode and the second and third embodiment use the discontinuous conduction mode.

In the second and third embodiments using the discontinuous conduction mode, the current in the transformer Tra becomes zero (or the energy stored in the transformer Tra becomes zero) during a switching period at the timing of the arrows indicated on the waveforms of Vdr in FIG. 6 and FIG. 8. After the timing, resonant oscillation begins in a resonant oscillation circuit composed of the inductor L1, the primary winding Lp of the transformer Tra, and a parasitic capacitance of the switching element Q1. This resonant oscillation is shown by the oscillating waveform on the waveform of Vdr after each arrow in FIG. 6 and FIG. 8.

Further described in the following are methods of calculating the power factor PF.

(a) A method of calculating a power factor in the fixed on-width control.

The line current Iac is approximately given by the equation (17) below.

$$Iac = K*Vac \qquad (17)$$

Using this equation, the equations (2) and (3) yield a power factor PF=1.

(b) A method of calculating a power factor PF in the fixed line current control.

The line current Iac is given by the equation (18) below.

$$Iac = K \qquad (18)$$

Using this equation, the equation (2) yields an effective power Pr as the equation (19) below.

$$Pr = 2K*V1 \qquad (19)$$

An apparent power Pa is given as the equation (20) below using the equation (3).

$$Pa = K*V1*\frac{\pi}{\sqrt{2}} \qquad (20)$$

Therefore, a power factor PF=Pr/Pa is obtained as the equation (21) below.

$$PF = \frac{2\sqrt{2}}{\pi} \cong 0.9 \qquad (21)$$

Thus, the power factors are obtained for both the (a) and (b) cases.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-083093, filed on Apr. 4, 2011. The disclosure of the priority application, in its entirety, including the drawings, claims, and the specification thereof, is incorporated herein by reference.

What is claimed is:

1. A switching regulator control circuit of a power factor correction type, that has a switching element connected to a primary winding of a transformer, and supplies a load with a predetermined output power from a secondary winding of the transformer, the switching regulator control circuit comprising:
   a means for supplying line current, obtained by rectifying AC power, from an AC power supply to, the primary winding of the transformer;
   a means for generating a switching instruction signal to turn-on the switching element connected to the primary winding;
   a resistance connected between a source terminal of the switching element and the ground;
   a means for detecting an on-width of the switching element and calculating a duty factor, the detecting an on-width being carried out based on the switching instruction signal;
   a means for performing a multiplication of i) a voltage value of a point between the source terminal of the switching element and the resistance, and ii) the calculated duty factor, and obtaining a multiplication result, wherein the multiplication result is proportional to the voltage value;
   a means for generating an error signal by amplifying a difference between a feedback signal from the load and a reference voltage; and
   a means for turning-off the switching element when the multiplication result and the error signal have become coincident.

2. The switching regulator control circuit according to claim 1, further comprising a maximum on-width limiting circuit that limits a maximum on-width of the switching element.

3. The switching regulator control circuit according to claim 2, wherein the switching instruction signal to the switching element is generated based on quasi-resonant control that controls turning-on of the switching element to be conducted at the timing when the current flowing in the primary winding of the transformer is a minimum.

4. The switching regulator control circuit according to claim 1, wherein the switching instruction signal to the switching element is generated based on a fixed oscillation frequency generated by an oscillator circuit.

5. The switching regulator control circuit according to claim 2, wherein the switching instruction signal to the switching element is generated based on a fixed oscillation frequency generated by an oscillator circuit.

6. A switching regulator comprising:
   a switching element connected to a primary winding of a transformer; and
   the switching regulator control circuit as defined by claim 1.

7. A switching regulator control circuit of a power factor correction type, that has a switching element connected to a primary winding of a transformer, and supplies a load with a predetermined output power from a secondary winding of the transformer, the switching regulator control circuit comprising:
   a means for supplying line current, obtained by rectifying AC power from an AC power supply, to the primary winding of the transformer;
   a means for generating a switching instruction signal to turn-on the switching element connected to the primary winding;
   a resistance connected between a source terminal of the switching element and the ground;
   a means for detecting an on-width of the switching element based on the switching instruction signal;

a means for performing a multiplication of i) a voltage value of a point between the source terminal of the switching element and the resistance, and ii) the detected on-width of the switching element, and obtaining a multiplication result, wherein the multiplication result is proportional to the voltage value;

a means for generating an error signal by amplifying a difference between a feedback signal from the load and a reference voltage; and a means for turning-off the switching element when the multiplication result and the error signal have become coincident.

8. The switching regulator control circuit according to claim 7, further comprising a maximum on-width limiting circuit that limits a maximum on-width of the switching element.

9. The switching regulator control circuit according to claim 8, wherein the switching instruction signal to the switching element is generated based on a fixed oscillation frequency generated by an oscillator circuit.

10. The switching regulator control circuit according to claim 7, wherein the switching instruction signal to the switching element is generated based on a fixed oscillation frequency generated by an oscillator circuit.

11. A switching regulator comprising:
a switching element connected to a primary winding of a transformer; and
the switching regulator control circuit as defined by claim 7.

12. A switching regulator control circuit of a power factor correction type that has a switching element connected to a primary winding of a transformer and supplies a load with a predetermined output power from a secondary winding of the transformer, the switching regulator control circuit comprising:
a line current supply circuit configured to supply a line current by rectifying AC power, from an AC power supply, to the primary winding of the transformer;
a generating circuit configured to generate a switching instruction signal to turn-on the switching element connected to the primary winding;
a resistance connected between a source terminal of the switching element and the ground;
an on-width detection circuit configured to detect an on width of the switching element and calculating a duty factor, the detecting an on-width being carried out based on the switching instruction signal;
a multiplication circuit configured to multiply i) a voltage value of a point between the source terminal of the switching element and the resistance, and ii) the calculated duty factor, and obtaining a multiplication result, wherein the multiplication result is proportional to the voltage value;
an error signal generation circuit configured to generate an error signal by amplifying a difference between a feedback signal from the load and a reference voltage; and
a turn-off circuit configured to turn off the switching element when the multiplication result and the error signal have become coincident.

13. A switching regulator control circuit of a power factor correction type that has a switching element connected to a primary winding of a transformer and supplies a load with a predetermined output power from a secondary winding of the transformer, the switching regulator control circuit comprising:
a line current supply circuit configured to supply a line current by rectifying AC power, from an AC power supply, to the primary winding of the transformer;
a generating circuit configured to generate a switching instruction signal to turn-on the switching element connected to the primary winding;
a resistance connected between a source terminal of the switching element and the ground;
an on-width detection circuit configured to detect an on width of the switching element based on the switching instruction signal;
a multiplication circuit configured to multiply i) a voltage value of a point between the source terminal of the switching element and the resistance, and ii) the detected on-width of the switching element, and obtaining a multiplication result, wherein the multiplication result is proportional to the voltage value;
an error signal generation circuit configured to generate an error signal by amplifying a difference between a feedback signal from the load and a reference voltage; and
a turn-off circuit configured to turn off the switching element when the multiplication result and the error signal have become coincident.

* * * * *